United States Patent
Ferre et al.

(10) Patent No.: US 10,065,531 B2
(45) Date of Patent: Sep. 4, 2018

(54) VEHICLE SEAT AND METHOD FOR ADJUSTING A VEHICLE SEAT

(71) Applicant: FAURECIA SIÈGES D'AUTOMOBILE, Nanterre (FR)

(72) Inventors: Ludovic Ferre, Flers (FR); Jean-Noël Rey, Flers (FR)

(73) Assignee: Faurecia Sièges D'Automobile, Nanterre (FR)

( * ) Notice: Subject to any disclaimer, the term of this patent is extended or adjusted under 35 U.S.C. 154(b) by 0 days.

(21) Appl. No.: 15/329,196

(22) PCT Filed: Jun. 29, 2015

(86) PCT No.: PCT/FR2015/051777
§ 371 (c)(1),
(2) Date: Jan. 25, 2017

(87) PCT Pub. No.: WO2016/012684
PCT Pub. Date: Jan. 28, 2016

(65) Prior Publication Data
US 2017/0225592 A1    Aug. 10, 2017

(30) Foreign Application Priority Data
Jul. 25, 2014    (FR) ..................... 14 57232

(51) Int. Cl.
*B60N 2/06*    (2006.01)
*B60N 2/20*    (2006.01)
(Continued)

(52) U.S. Cl.
CPC ............. *B60N 2/08* (2013.01); *B60N 2/0228* (2013.01); *B60N 2/0232* (2013.01);
(Continued)

(58) Field of Classification Search
CPC ................ B60N 2/08; B60N 2002/0236; B60N 2/0232; B60N 2/0228; B60N 2/0881; B60N 2/0875; B60N 2/22
(Continued)

(56) References Cited

U.S. PATENT DOCUMENTS

| 5,348,373 A | 9/1994 | Stiennon |
| 6,113,051 A | 9/2000 | Moradell et al. |

(Continued)

FOREIGN PATENT DOCUMENTS

| CN | 101269630 B | 11/2010 |
| DE | 102011120854 A1 | 6/2013 |
| FR | 2759330 A1 | 8/1998 |

OTHER PUBLICATIONS

International Search Report for International application No. PCT/FR2015/051777, dated Oct. 26, 2015, 3 pages.
(Continued)

*Primary Examiner* — Rodney Barnett White
(74) *Attorney, Agent, or Firm* — Reising Ethington P.C.

(57) ABSTRACT

A vehicle seat and method for adjusting the vehicle seat uses a hinge mechanism (18), a guide mechanism (20), and a single actuation device (22) designed to function selectively either in a backrest control mode, acting on the blocking device (28) in order to move the blocking device (28) towards the release position, or in a track (30) control mode, acting on the locking device (36) in order to move the locking device (36) towards the unlocking position. The actuation device (22) is controlled by a user to cause the actuation device to function either in backrest control mode or in track (30) control mode.

18 Claims, 4 Drawing Sheets

(51) Int. Cl.
*B60N 2/22* (2006.01)
*B60N 2/08* (2006.01)
*B60N 2/02* (2006.01)

(52) U.S. Cl.
CPC ......... *B60N 2/0875* (2013.01); *B60N 2/0881* (2013.01); *B60N 2/22* (2013.01); *B60N 2002/0236* (2013.01)

(58) Field of Classification Search
USPC ............ 297/342, 344.11, 362, 362.11, 361.1
See application file for complete search history.

(56) References Cited

U.S. PATENT DOCUMENTS

| | | | | |
|---|---|---|---|---|
| 6,120,098 | A * | 9/2000 | Magyar | B60N 2/20 297/344.11 |
| 7,036,885 | B2 * | 5/2006 | Ganot | B60N 2/08 297/344.11 X |
| 7,374,243 | B2 | 5/2008 | Kayumi et al. | |
| 7,669,825 | B2 * | 3/2010 | Sung | B60N 2/0825 297/344.11 X |
| 7,740,316 | B2 * | 6/2010 | Beneker | B60R 22/26 297/344.11 |
| 7,794,018 | B2 * | 9/2010 | Fukuda | B60N 2/0818 297/344.11 X |
| 7,938,490 | B2 * | 5/2011 | Ishijima | B60N 2/0296 297/344.11 X |
| 2004/0262969 | A1 * | 12/2004 | Sasaki | B60N 2/0705 297/344.11 |
| 2005/0248302 | A1 | 11/2005 | Garland | |
| 2006/0102821 | A1 * | 5/2006 | Kuliha | B60N 2/071 297/344.11 X |
| 2008/0012411 | A1 | 1/2008 | Kennedy et al. | |
| 2008/0231103 | A1 | 9/2008 | Rohee | |
| 2009/0108655 | A1 * | 4/2009 | Yokoyama | B60N 2/12 297/344.11 |
| 2009/0134679 | A1 | 5/2009 | Crainic et al. | |
| 2013/0193735 | A1 * | 8/2013 | Bonk | B60N 2/0232 297/378.12 |

OTHER PUBLICATIONS

Translation of Written Opinion for for International application No. PCT/FR2015/051777, dated Oct. 26, 2015, 8 pages.
Chinese Office Action with English translation, corresponding to application No. 201580043351.3, dated May 25, 2018, 9 pages.
European Office Action with English translation, corresponding to application No. 201580043351.3, dated May 3, 2018, 3 pages.

* cited by examiner

VEHICLE SEAT AND METHOD FOR ADJUSTING A VEHICLE SEAT

TECHNICAL FIELD

The present invention relates to a vehicle seat and to a method for adjusting such a vehicle seat.

BACKGROUND OF THE INVENTION

More particularly, the invention relates to a vehicle seat comprising:
- a seating part,
- a backrest mounted so as to pivot on the seating part, for example about at least one axis of rotation,
- a hinge mechanism adapted for adjusting the angular position of the backrest relative to the seating part, the hinge mechanism comprising:
    - a first frame intended to be fixed to the seating part and a second frame intended to be fixed to the backrest, for example the first frame and the second frame being mounted so as to rotate relative to one another about the axis of rotation,
    - a blocking device for maintaining the angular position of the second frame relative to the first frame, the blocking device being movable between a blocked position where said release member maintains the angular position of the second frame relative to the first frame and a release position where said blocking device allows the second frame to move relative to the first frame.
- a guide mechanism comprising:
    - a track unit comprising a first rail and a second rail both extending in a longitudinal direction and mounted so as to slide relative to one another along the longitudinal direction, in particular the second rail being integrally fixed to the first frame of the hinge mechanism, and
    - a locking device mounted so as to be movable between a locking position where the position of the second rail relative to the first rail is locked, and an unlocking position where said locking device allows the second rail to move relative to the first rail.

Document U.S. Pat. No. 7,374,243B2 discloses an example of a vehicle seat with an actuation device acting on the relative position of a first slide rail relative to a second slide rail and on the relative position of the seating part and backrest in order to fold the seat to provide a larger space for a vehicle occupant to enter the passenger compartment of a vehicle.

In particular, the system described in document U.S. Pat. No. 7,374,243B2 allows fully folding the seating part and backrest against one another before unlocking the seat for translational movement.

The system described in U.S. Pat. No. 7,374,243B2 requires sequencing these two actions to allow easier entry into the passenger compartment of a vehicle. To perform the specific sequence (and avoid translational movement of the seat prior to folding it, which would reduce the desired increase in space for passenger entry), the system described in U.S. Pat. No. 7,374,243B2 comprises a sensor and a control loop to avoid premature translation of the seat before the backrest and seating part are folded down.

The system described in U.S. Pat. No. 7,374,243B2 is therefore complex and cumbersome to implement, with the use of a large control unit, and applies only to the retraction of a motor vehicle seat.

Document US2008/012411 discloses a seat of the aforesaid type which further comprises a single actuation mechanism, adapted to operate selectively in either a backrest control mode, acting on the blocking device to cause movement of the blocking device to the release position, or in a track control mode, acting on the locking device to cause movement of the locking device to the unlocking position, the actuation device being controlled by control means operable by a user to cause the actuation device to operate either in backrest control mode or track control mode.

SUMMARY OF THE INVENTION

An aim of the present invention is to reduce the complexity of the hinge and guide mechanisms of vehicle seats. In particular, an aim of the present invention is to combine simplicity of operation, adjustment assistance, and speed of operation, of a vehicle seat comprising hinge and guide mechanisms, in particular to enable comfortable adjustment of the vehicle seat.

To this end, according to at least some embodiments of the invention, a seat of the kind in question is characterized in that the seat further comprises a transmission member actuated by the actuation device, the transmission member being arranged between the actuation device and the blocking and locking devices, the transmission member being adapted for moving the locking device to the unlocking position and the blocking device to the release position.

With these arrangements, a seat is provided that is simple to implement with a reduced number of parts, while ensuring safe operation of the device, simple maneuverability for a user, and increased comfort. In addition, by reducing the number of parts, the weight and bulk of such systems are also reduced. These results are obtained because a single member (for example a cam or the like) transmits a movement from the actuation device to either the blocking device or the locking device. The control input to the actuation device may take any known form and may be single or double, depending on the ergonomic choices made by the seat designer.

In preferred embodiments of the invention, one or more of the following arrangements may possibly be used:
- the seat further comprises at least one control member operable by a user to operate the actuation device;
- the transmission member is driven by the actuation device either in a first direction, to move the locking device to the unlocked position, or in a second direction opposite the first direction, to move the blocking device to the release position;
- the actuation device is controlled so as to operate the actuation device in either backrest control mode or track control mode, independently of the angular position of the second frame relative to the first frame;
- the seat comprises a first control member operable by a user to operate the actuation device in backrest control mode and a second control member operable by a user to operate the actuation device in track control mode;
- the first control member and the second control member are directly connected to the actuation device, there thus being no possible confusion for a user between backrest adjustment and track adjustment;
- the blocking device is resiliently biased towards the blocking position. In the absence of a specific command, the relative position of the first and second frames is fixed;

the locking device is resiliently biased towards the locking position. In the absence of a specific command, the relative position of the first rail and second rail is fixed;

the transmission member is mounted so as to rotate about an axis of rotation and is operable by the actuation device in a first direction so as to move the locking device to the unlocking position and in a second direction opposite the first direction so as to move the blocking device to the release position. Thus, as the transmission member cannot rotate simultaneously in the both the first and second directions of rotation, it is only possible to control one of the devices at a time, which increases safety and comfort when using the seat;

the locking device comprises an unlocking member and an unlocking pin, the unlocking member being mounted so as to be movable between an inactive position where it is at a distance from the unlocking pin and an active position where it exerts force on the unlocking pin causing the unlocking pin to resist the resilient bias that maintains the first rail in fixed position relative to the second rail;

the transmission member comes in contact with the unlocking member so as to move the latter from the inactive position to the active position. More specifically, the transmission member acts directly on the unlocking member;

the transmission member is a cam;

the blocking device comprises a driving member assembled to the transmission member in order to control the release of the second frame relative to the first frame;

the driving member is a cable;

the driving comprises a first end and a second end, the first end being assembled to the cam, the second end cooperating directly with the blocking device. The cable directly connects the cam to the frame mechanism;

the first end of the cable comprises a pin for retaining the cable on the transmission member so that rotation of the transmission member in the second direction causes the cable to wind around the cam. Thus, rotation of the transmission member in the second direction provides tension in the cable;

the transmission member comprises a groove in which the cable is intended to be housed when it is wound. The groove ensures retention of the cable on the cam;

the actuation device is fixed to the track unit. Attachment of the actuation device to the track unit is simple to implement;

the actuation device is an electric actuator and/or a piezoelectric motor and/or comprises a shape-memory alloy. Several types of actuation members may be compatible with the seat;

the actuation device is an electric actuator cooperating with a reversible gear motor;

a return spring is associated with the actuation device. In the absence of power to the electric actuator, the return spring causes a resilient return of the electric actuator to a rest position, where the actuation device is not acting on either the blocking device or the locking device. One can thus allow the blocking and locking devices to return to their "stable" positions in the absence of a specific command at the actuation device;

the seat comprises a second track unit and a second locking device, the second locking device being connected to the locking device of the first track unit by a crosspiece. Thus, the locking devices for the first and second track units can be actuated simultaneously, in particular to control simultaneously the unlocking of the first and second track units and thus allow the simultaneous sliding of the second rails of the first and second track units relative to the first rails of the first and second track units.

The invention also provides a method for adjusting the position of a seat such as described, comprising the following steps:

controlling the actuation device in a track control mode and moving the second rail relative to the first rail so as to adjust the longitudinal position of the seating part of the seat, controlling the actuation device in a backrest control mode and moving the backrest relative to the seating part so as to adjust the angular position of the backrest relative to the seating part, the steps being independent of one other, it being possible for one to take place before, after, or in the absence of the other.

Of course, the different features, variants, and/or embodiments of the invention may be combined with one another in various combinations, as long as they are not incompatible or mutually exclusive of one another.

BRIEF DESCRIPTION OF THE DRAWINGS

The invention will be better understood and other features and advantages will become apparent upon reading the following detailed description which includes embodiments given for illustrative purposes with reference to the appended figures, presented as non-limiting examples, which can serve to enhance the understanding of the invention and the description of its implementation and, where appropriate, contribute to its definition, in which.

DETAILED DESCRIPTION OF AN ILLUSTRATIVE EMBODIMENT

Note that in the figures, structural and/or functional elements common to the various embodiments may have the same references. Thus, unless otherwise indicated, such elements have identical structural, dimensional, and material properties.

For clarity, only those elements useful to understanding the described embodiments are represented and will be detailed.

In the following description, when reference is made to absolute position qualifiers such as the terms 'front', 'back', 'top', 'bottom', 'left', 'right', etc., or relative qualifiers such as the terms 'above', 'below', 'upper', 'lower', etc., or orientation qualifiers, these are in reference to a seat in a normal position of use, in the usual direction of advancement of the vehicle.

In the following description, the terms 'locking device' and 'blocking device' will be interpreted in a broad sense to define a device adapted to perform an action intended to render a first element movable or immovable relative to a second element, regardless of the initial relative position of the first and second elements.

Similarly, in the following description, the terms 'unlocking member' and 'release member' of a first element relative to a second element should be interpreted in a broad sense to define a member adapted to implement an action linked to the first and/or second element in order to render the first element movable relative to the second element regardless of the initial relative position of the first element to the second element.

Figure 1:
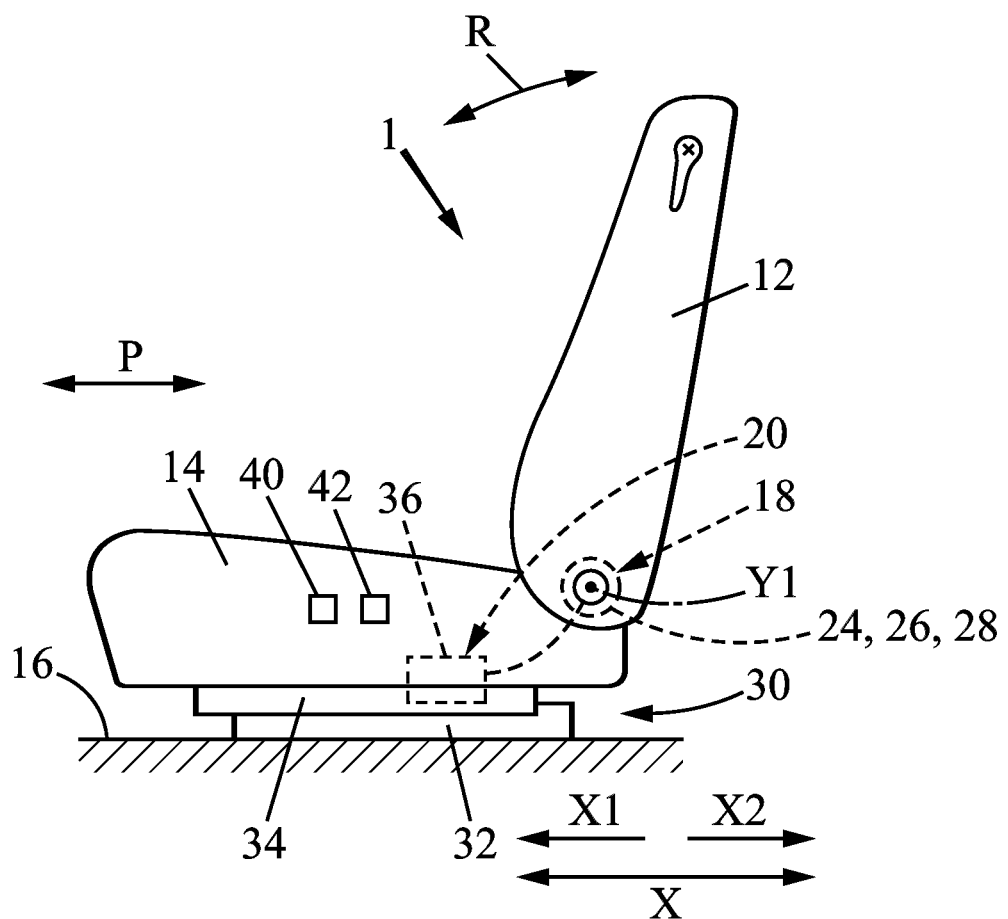
FIG. 1 is a schematic view of a vehicle seat according to the invention, comprising a guide mechanism, a hinge mechanism, and an actuation device.

FIG. 1 is a schematic view of a seat 1, in particular a vehicle seat 1 according to an embodiment of the invention. More particularly, FIG. 1 represents the seat 1 with a backrest 12 mounted so as to pivot about at least one pivot axis Y1 on a seating part 14. The seating part 14 is mounted so as move in translation on a fixed structure 16, in particular the vehicle floor.

The seat 1 is such that it is possible to adjust a tilt R of the backrest 12 relative to the seating part 14 and a position P of the seat 1 relative to the fixed structure 16.

Figure 2:
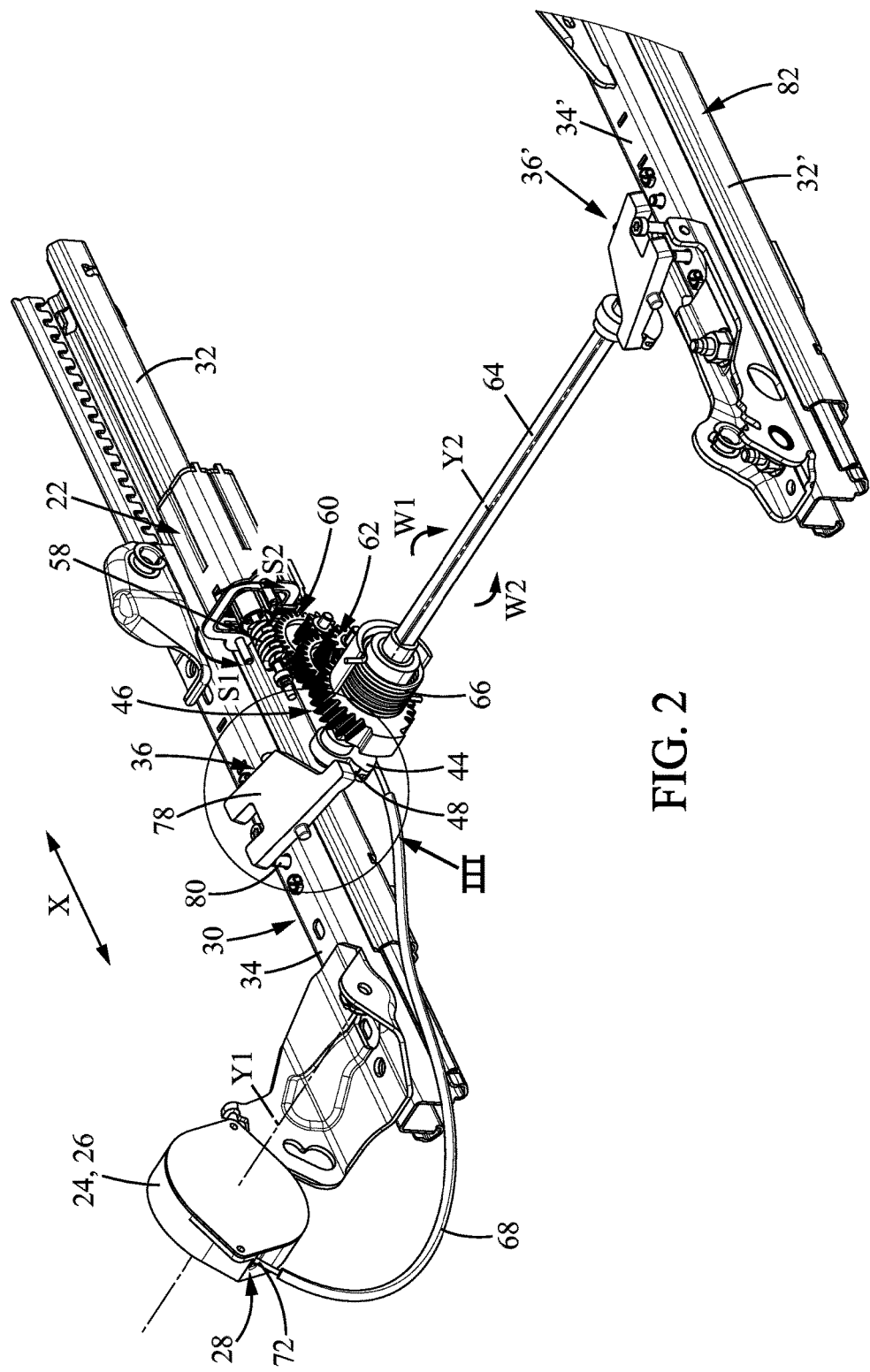
FIG. 2 is an enlarged perspective view of the guide mechanism, the hinge mechanism, and the actuation device of FIG. 1.

In the current case, the seat 1, as represented in particular in FIG. 1, comprises a hinge mechanism 18 adapted for adjusting the tilt R of the backrest 12, a guide mechanism 20 adapted for adjusting the position P of the seat 1 relative to the fixed structure 16, and an actuation device 22 (visible in FIG. 2).

The hinge mechanism 18 comprises a first frame 24. The first frame 24 is secured to a structural element of the seating part 14. For example, the first frame 24 may be formed by a disc-shaped metal flange normal to the pivot axis Y1.

The hinge mechanism 18 comprises a second frame 26. For example, the second frame 26 is secured to a structural member of the backrest 12. The second frame 26 may be, for example, formed by a disc-shaped metal flange normal to the pivot axis Y1.

The first frame 24 and the second frame 26 are mounted so as to rotate relative to one another about the pivot axis Y1. For example, the first frame 24 and the second frame 26 may be interconnected by a rotation device (not shown) enabling easy rotation between the first frame 24 and the second frame 26. This rotation device is conventional and will not described in more detail.

The hinge mechanism 18 further comprises a blocking device 28 adapted to maintain or to define an angular position of the second frame 26 relative to the first frame 24. Thus, a user of the seat 1, after choosing the desired angular position of the backrest 12 relative to the seating part 14, can lock this angular position so that it is stable. More specifically, the blocking device 28 is movable between a blocking position and a release position. In the blocking position, the blocking device 28 fixes the angular position of the second frame 26 relative to the first frame 24. Thus, in the blocking position of the blocking device 28, the second frame 26 cannot move relative to the first frame 24 about the pivot axis Y1. In other words, the backrest 12 cannot move relative to the seating part 14. For example, the blocking device 28 acts on the rotation device (not shown) by means of a lock or any other type of structure that prevents rotation. This lock or these rotation-prevention structures are conventional and will not be described in more detail. In the release position, the blocking device 28 allows the second frame 26 to move relative to the first frame 24 about the pivot axis Y1.

The blocking device 28 may be resiliently biased towards the blocking position. The blocking position is thus a position referred to as "stable". However, in alternative embodiments, the blocking device 28 may not be resiliently biased towards a particular position, or may have two positions referred to as "stable", for example the blocking position and the release position.

As mentioned above, the seat 1 comprises a guide mechanism 20. The guide mechanism 20 comprises a track unit 30. The track unit 30 allows adjusting, for example, the position P of the seat 1 relative to the fixed structure 16, in particular the floor of the vehicle, by a sliding of the track unit in a longitudinal direction X, in particular in a first direction X1 (rearward in the current case) and in a second direction X2 opposite to the first direction X1 (forward in the current case).

The track unit 30 comprises a first rail 32 and a second rail 34. The first rail 32 and the second rail 34 extend in the longitudinal direction X. The first rail 32 and second rail 34 are mounted so as to slide relative to one another along the longitudinal direction X, in a first direction X1 and in a second direction X2. For example, the second rail 34 is integrally assembled to a structural member of the seating part 14. Similarly, the first rail 32 is, for example, integral with the fixed structure 16, in particular integral with the vehicle floor. The first rail 32 is therefore also called the fixed rail or lower rail. Similarly, it follows that the second rail 34 is also called the movable rail or upper rail.

To prevent sliding of the second rail 34 relative to the first rail 32, the guide mechanism 20 further comprises a locking device 36.

The locking device 36 is mounted so as to be movable between a locking position and an unlocking position. In the locking position, the locking device 36 locks the position of the second rail 34 relative to the first rail 32, thus preventing any relative movement along the longitudinal axis X of the second rail 34 relative to the first rail 32. In the unlocking position, the locking device 36 allows the second rail 34 to move relative to the first rail 32.

The locking device 36 may be resiliently biased towards the locking position. The locking position is thus a position referred to as "stable". However, in alternative embodiments, the locking device 36 may not be resiliently biased towards a particular position, or may have two positions referred to as "stable", for example the locking position and the unlocking position.

The guide mechanism 20 and the hinge mechanism 18 are actuated by a single actuation device 22. In other words, the actuation device 22 can ensure the movement of the blocking device 28 to a blocking position or release position and the locking device 36 to a locked position or unlocked position.

For example, the locking device 36 is resiliently biased towards the locking position, thus the actuation device 22 ensures the displacement of the locking device 36 to the unlocked position. Similarly, the blocking device 28 is resiliently biased towards the blocking position, thus the actuation device 22 ensures the displacement of the blocking device 28 to the release position.

The actuation device 22 is thus adapted for selectively operating in either a backrest 12 control mode or a track 30 control mode.

In backrest 12 control mode, the actuation device 22 acts on the blocking device 28 to cause displacement of the blocking device 28 to the release position in particular.

In track 30 control mode, the actuation device 22 acts on the locking device 36 to cause displacement of the locking device 36 to the unlocking position in particular.

In the current case, when the blocking device 28 is resiliently biased towards the blocking position, the actuation device 22 can thus act on the blocking device 28 to cause displacement of the blocking device 28 from the blocking position to the release position.

When the locking device 36 is resiliently biased towards the locking position, the actuation device 22 can act on the locking device 36 to cause displacement of the locking device 36 from the locking position to the unlocking position.

However, in alternative embodiments, the blocking device 28 may not be resiliently biased towards the blocking position. The actuation device 22 ensures the displacement of the blocking device 28 between the blocking and release positions.

In alternative embodiments, the locking device 36 may not be resiliently biased towards the locking position. The actuation device 22 ensures the displacement of the locking device 36 between the locking and unlocking positions.

The actuation device 22 may be an electric actuator. However, in alternate embodiments, the actuation device 22 may be a piezoelectric motor, and pneumatic or hydraulic types of motors may be considered as well. The actuation device 22 may also be composed of a shape-memory alloy adapted for deforming under particular environmental conditions in a manner that transmits motion. The actuation device 22 may also take the form of any element suitable for setting in motion the locking device 36 and blocking device 28.

The actuation device 22 is, for example, fixed to the track unit 30.

In alternative embodiments, the actuation device 22 may be fixed to the backrest 12 or in proximity to the backrest 12, or in proximity to the first frame 24 and the second frame 26.

The actuation device 22 may be controlled by the user via control means, for example via a control member 40, 42, to operate the actuation device 22 either in backrest 12 control mode or in track 30 control mode.

According to one embodiment, the actuation device 22 may be controlled by the user via a first control member 40 and a second control member 42. For example, the first control member 40 controls the actuation device 22 so that it acts on the blocking device 28 (in backrest 12 control mode). The second control member 42 may be actuated, for example by a user, to control the actuation device 22 so that the actuation device 22 acts on the locking device 36 (in track 30 control mode).

In this case, the first control member 40 and second control member 42 are directly connected to the actuation device 22.

The first control member 40 and second control member 42 may be grouped within a single general control member. For example, the general control member may be in the form of a "joystick", a single button, or any other manual control mechanism comprising a single general control element working with multiple controlled members.

The first control member 40 and the second control member 42 may also each be separated into a plurality of distinct control sub-members, each sub-member controlling a specific function. For example, a first sub-member of the first control member 40 may control the actuation device 22 so that it acts on the blocking device 28 in a first direction, and a second sub-member of the first control member 40 may control the actuation device 22 so that it acts on the blocking device 28 in a second direction. Similarly, a first sub-member of the second control member 42 may control the actuation device 22 so that it acts on the blocking device 28 in a first direction, and a second sub-member of the first control member 40 may control the actuation device 22 so that it acts on the locking device 36 in a second direction.

The first control member 40 and the second control member 42 may also be accessible to a user, in the form of a touch interface.

As represented in FIG. 1, the first control member 40 and the second control member 42 form two separate bodies. The presence of two different control members 40, 42, for controlling the blocking device 28 to cause the actuation device 22 to operate in either backrest 12 control mode or track 30 control mode, is particularly advantageous as it allows the user to have two separate members for controlling two separate devices and thus avoids any confusion.

The control members 40, 42 may be, for example, push buttons or any other switches.

The first control member 40 and the second control member 42 may be arranged in the vicinity of the seating part 14. However, in alternative embodiments, the first control member 40 and the second control member 42 may be arranged remotely from the seating part 14, and may be on the dashboard of the vehicle for example or at other locations ergonomically accessible to the user.

Figure 3:
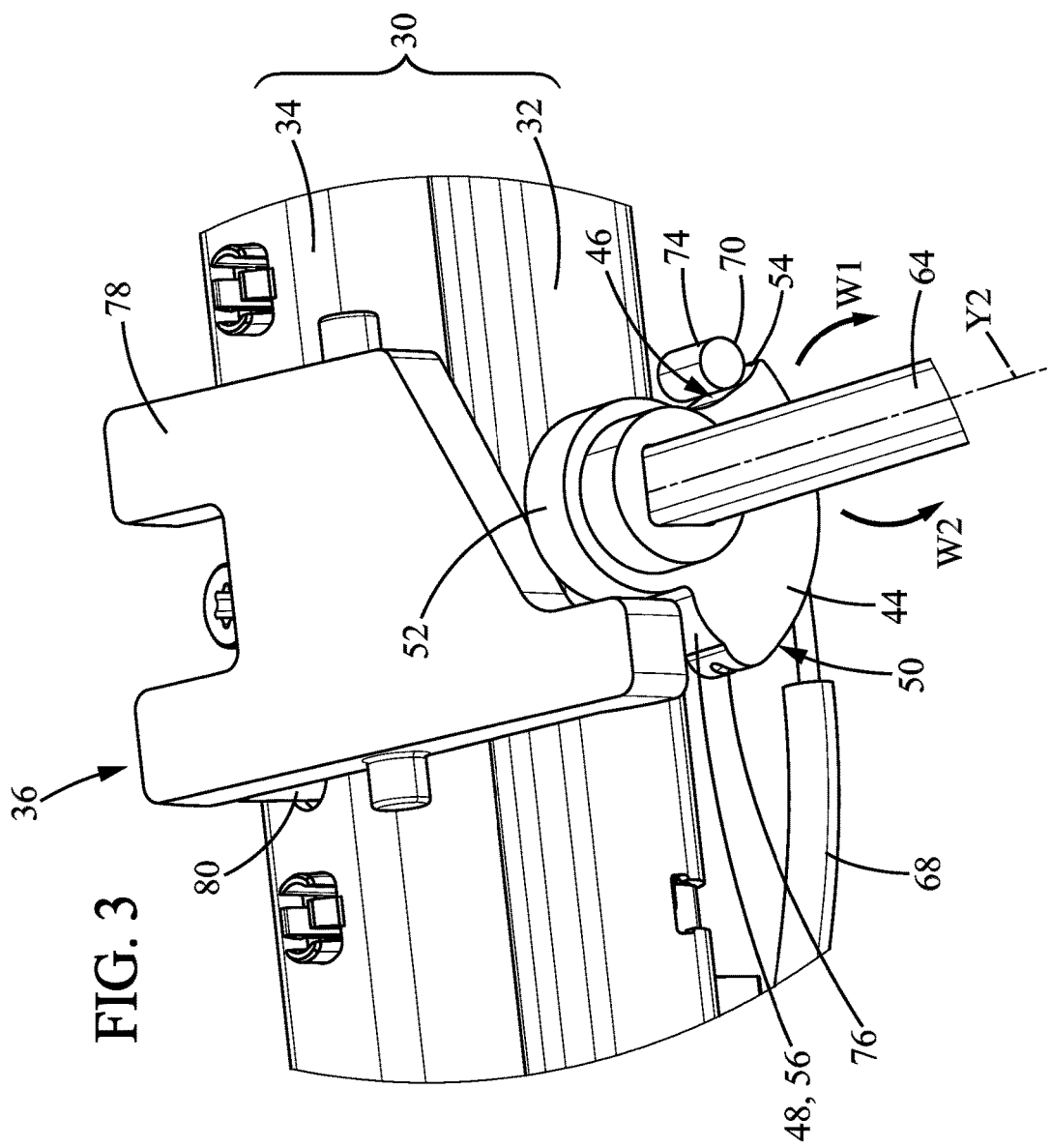
FIG. 3 is a detailed schematic view of III of FIG. 2.
Figure 4:
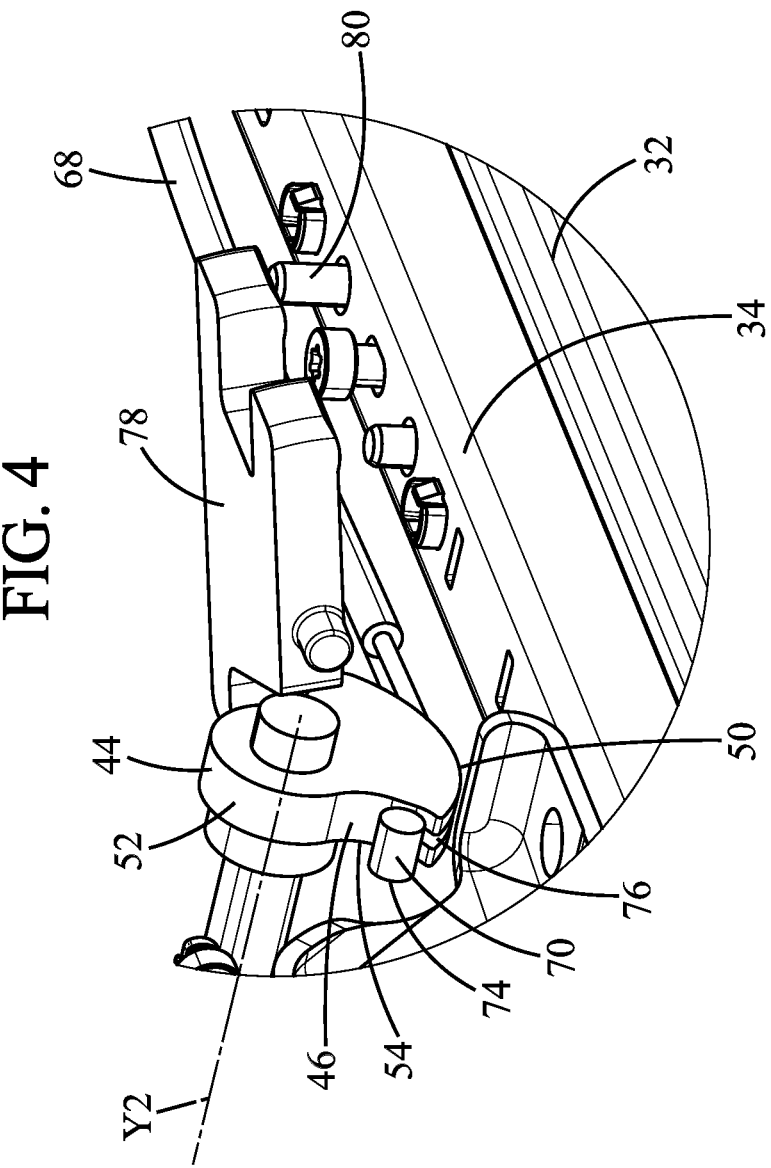
FIG. 4 is a perspective view of an unlocking member of the guide mechanism of FIG. 1.

In this case, as can be seen in FIGS. 2, 3, and 4, the actuation device 22 is connected to a transmission member 44 which in turn is connected to both the locking device 36 and the blocking device 28.

The transmission member 44 allows transmitting movement of the actuation device 22 either to the blocking device 28 or to the locking device 36. In the current example, the transmission member 44 is rotatable about an axis of rotation Y2 of the transmission member.

The transmission member 44 may comprise a first part 46 for controlling the blocking device 28 and a second part 48 for controlling the locking device 36.

The transmission member 44 is a cam 44 for example, as shown in FIGS. 2, 3, and 4. The cam 44 has a cam profile.

In the following description, the transmission member 44 is a cam 44. However, in alternative embodiments, any known type of transmission member may be considered.

As an example, as represented in FIGS. 3 and 4, the cam 44 comprises, for example, a first cam part 46 for controlling the blocking device 28 and a second cam part 48 for controlling the locking device 36.

For example, the cam 44 comprises two portions 50, 52, advantageously substantially semi-circular, and the first portion 50 of the cam 44 preferably has a greater radius than the second portion 52 of the cam 44. A shoulder 54, 56 may be provided between the two portions 50, 52 of the cam 44. More specifically, a first shoulder 54 and a second shoulder 56 may be provided. The shoulders 54, 56 ensure the continuity of the cam profile between the first portion 50 and the second portion 52.

The first cam part 46, which controls the blocking device 28, may be provided at least in part in the first portion 50 of the cam 44 and in the first shoulder 54. The second cam part 48, which controls the locking device 36, may be provided at least in part in the second shoulder 56.

In the embodiment represented in FIG. 2, the actuation device 22 comprises a rotatable actuating rod 58. A transmission system 60 is directly assembled to the actuating rod 58. The transmission system 60 is adapted to transmit the movement of the actuating rod 58 to a crosspiece 64 to which the transmission member 44 (or cam 44 as represented in the figures) is directly fixed. The crosspiece 64 is thus rotatable about a crosspiece axis (which in the current case is the transmission member axis of rotation Y2).

By way of example, and as illustrated in FIG. 2, The transmission system 60 may comprise a wheel and worm screw system 60. A reduction device 62, for example a gear motor 62, in particular a reduction gear motor 62, may be arranged after the wheel and worm screw system 60.

The actuation device 22 and the transmission system 60, and/or the reduction member 62, are reversible. Thus, the actuating rod 58 is rotatable about its axis in a first direction of rotation S1 and in a second direction of rotation S2. The first direction of rotation S1 is opposite to the second direction of rotation S2, as shown in FIG. 2.

The transmission system 60 thus transmits to the cross-piece 64, and therefore to the cam 44, a rotational movement in a first direction of rotation W1 and in a second direction of rotation W2 that is opposite the first direction of rotation W1.

For example, a return spring 66 is provided so as to allow, in particular in the absence of electric power, an elastic return of the actuation device 22 to a rest position, where the actuation device 22 is not acting on either the blocking device 28 or the locking device 36.

In the current case, in the absence of actuation of the actuation device 22, the cam 44 is in a neutral position where it is not controlling either the blocking device 28 or the locking device 36.

As stated above, the first cam part 46 controls the blocking device 28. More specifically, as represented in FIGS. 2 and 3, the blocking device 28 comprises a driving member 68 assembled to the transmission member 44. In the current case the driving member 68 is assembled to the first part 46 of the transmission member 44 formed at least in part by the first shoulder 54.

As represented in the figures, the driving member 68 comprises a cable 68. The cable 68 extends longitudinally between a first end 70 and a second end 72. The first end 70 of the cable 68 is connected to the cam 44.

For example, the first end 70 of the cable 68 has a retaining pin 74 or an elbow portion which holds the cable 68 on the cam 44. The second end 72 of the cable 68 is arranged near one of the first frame 24 and the second frame 26. For example, in the case of a rotation device enabling easy rotation between the first frame 24 and the second frame 26, the second end 72 of the cable 68 is arranged directly adjacent to a lock or a release pin for releasing the blocking device 28. However, other blocking mechanisms may be envisaged.

A movement of the cam 44 in the second direction W2 causes the cable 68 to wind, in particular partly around the first portion 50 of the cam 44. The first portion 50 of the cam 44 has, for example, a groove 76 on the outer surface and the cable 68 is received in the groove 76. The groove 76 retains the cable 68 around the cam 44.

The winding of the cable 68 partly around the cam 44 exerts tensile force on an element inside or in proximity to the first and second frames 24, 26. More specifically, when the cable 68 is partly wound around the cam 44, the second end 72 of the cable 68 is adapted to exert tensile force on a release pin or similar element in a manner that releases the angular position of the second frame 26 relative to the first frame 24.

In the case of a blocking device 28 resiliently biased towards the blocking position, as the cable 68 is partially wound around the cam 44, it exerts tensile force which counteracts the resilient bias towards the blocking position, causing the blocking device 28 to move from the blocking position to the release position.

A movement of the cam 44 in the first direction W1 towards the neutral position causes an "unwinding" of the cable 68, and the blocking device 28, for example resiliently biased towards the blocking position, can return to the release position as the tensile force described above is no longer applied. In addition, a displacement of the cam 44 in the first direction W1 beyond the neutral position of the cam 44 has the effect that no force is transmitted to force the release of the blocking device 28, and the blocking device 28 maintains the blocking position.

In alternative embodiments, the release member 28 may be any flexible or rigid part which the cam 44, upon rotation in the second direction of rotation W2 from the neutral position, actuates in a direction that exerts a force that forces the blocking device 28 towards the blocking position.

The second cam part 48 controls the locking device 36. The locking device 36 comprises, for example, as represented in FIGS. 2 and 4, an unlocking member 78 and at least one unlocking pin 80. The unlocking member 78 is mounted so as to be movable between an active position and an inactive position. For example, in the inactive position, the unlocking member 78 is at a distance from the unlocking pin 80. The locked position may be a position of the locking device 36 referred to as "stable", for example, being resiliently biased towards the locked position. Thus, in the absence of any force on the unlocking pin 80 (in other words when the unlocking member is at a distance from the unlocking pin), the second rail 34 remains in a locked position relative to the first rail 32.

In the active position of the unlocking member 78, the unlocking member 78 exerts force on the unlocking pin 80. By exerting force on the unlocking pin 80, the unlocking member 78 causes the unlocking pin 80 to move against the resilient bias that is keeping the first rail 32 fixed in place relative to the second rail 34, allowing a first displacement of the first rail 32 relative to the second rail 34.

The unlocking member 78 is, for example, mounted so as to pivot between the inactive position and the active position, as can be seen in FIG. 2, 3, or 4. The unlocking member 78 has a portion intended to come into contact, for example sliding contact, with the second cam part 48, substantially corresponding to the second shoulder 56. Upon rotation in the first direction W1 from the neutral position, the cam 44 exerts force on the unlocking member 78 which causes the latter to rotate from the inactive position to the active position.

More specifically, the portion of the unlocking member 78 in sliding contact with the second shoulder 56 is "lifted" during rotation of the cam in the first direction W1. This lifting causes the unlocking member 78 to pivot and a portion of the unlocking member 78 facing the unlocking pin 80 bears on the unlocking pin 80 and applies force to the unlocking pin 80. The second rail 34 is thus unlocked relative to the first rail 32.

When the cam 44 is moved in the second direction of rotation W2 from the neutral position, none of the cam 44 surface applies force to the unlocking member 78 which then remains in the inactive position. The unlocking member 78 is in contact with the second shoulder 56 on the side of the second portion 52 of the cam 44 which has a smaller diameter than the first portion 50 of the cam 44. Thus, no surface of the second portion 52 of the cam 44 is able to apply force to the unlocking member 78. Rotation of the cam 44 in the second direction W2, in particular from the neutral position of the cam 44, therefore has no impact on the locked position of the locking device 36.

As a result of the foregoing, a single actuation device 22 can control the release of the blocking device 28 and the unlocking of the locking device 36.

The direction of rotation of the actuating rod determines which of the blocking device 28 and locking device 36 is controlled, and then selectively determines the backrest 12 control mode or the track 30 control mode. The blocking device 28 therefore cannot be moved into a release position when the locking device 36 is in the unlocked position. Similarly, the locking device 36 cannot be moved into an unlocking position when the blocking device 28 is in the release position.

The actuation device 22 thus actuates either the blocking device 28 or the locking device 36.

As previously mentioned, in alternative embodiments the actuation device 22 may be secured to the backrest 12 or in proximity to the backrest 12, or in proximity to the first frame 24 and the second frame 26. For example, the actuation device 22 may be secured to a lateral side of the backrest 12 near the first and second frames 24, 26 so as to directly control the hinge mechanism 18.

For example, in an alternative embodiment, the transmission system 60 is adapted to transmit the movement of the actuating rod 58 directly to the blocking device 28 to fix the angular position of the second frame 26 relative to the first frame 24, without a transmission member interfacing between the actuating member 22 and the blocking device 28.

In this alternative embodiment (not shown), a first transmission member may be provided in proximity to the actuating element 22 and the transmission system 60 and a second transmission member may be provided in proximity to the track unit 30 and the locking device 36. The cable 68 is then connected at the first end to the first transmission member and at the second end to the second transmission member. The first transmission member then enables the winding or unwinding of the cable 68. The second transmission member is adapted to exert force on the unlocking member 78 in order to move it into the active position. The winding of the cable 68 around the first transmission member exerts tensile force from the second end 72 of the cable 68 on the second transmission member, which has the effect of moving the unlocking member 78 between the inactive and active positions described above.

As represented in part in FIG. 2, a second track unit 82 may be provided. The second track unit 82 is arranged parallel to the first track unit 30 described above and is substantially similar to it. The second track unit 82 comprises a first rail 32' and a second rail 34', both extending in the longitudinal direction X and mounted so as to slide relative to one another in the longitudinal direction X. The second rail 34' of the second track unit 82 may be integrally fixed to the first frame 24 of the hinge mechanism 18. The second track unit 82 may cooperate with a second locking device 36' adapted to lock the position of the second rail 34' relative to the first rail 32'. The second locking device 36', in order to act synchronously with the first locking device 36, is connected to the locking device 36 of the first track unit by the crosspiece 64.

To adjust the position of the vehicle seat 1 described above, various steps may be implemented.

In a first step, the actuation device 22 is controlled, for example via the second control member 42, to move the locking device 36 from the locked position to the unlocked position and thus allow movement of the second rail 34, 34' relative to the first rail 32, 32' in order to adjust the position P of the seating part 14 of the seat 1 in the longitudinal direction X relative to the fixed structure 16.

In a second step, the actuation device 22 is controlled, for example via the first control member 40, to move the blocking device 28 from the blocking position to the release position (backrest 12 control mode) and thereby allow movement of the second frame 26 relative to the first frame 24 in order to adjust the angular position of the backrest 12 relative to the seating part 14. The first frame 24 may in particular be moved relative to the second frame 26 by a certain angular displacement, for example less than 150°, preferably less than 120°, more particularly less than 90°, or less than 50°, or less than 30°.

In addition, it is possible to perform the second step before or after the first step. It is also possible to perform one among the first and second steps without performing the other. Thus the seat 1 allows making comfortable adjustments to the position of the seat backrest 12 relative to the seating part 14 and/or of the seating part 14 relative for example to the vehicle floor. Here, "comfortable adjustment" is understood to mean an adjustment to the position of a seat during use of the seat, in particular when the user is sitting on the seat 1.

The invention is of course not limited to the embodiments described above and provided only as examples. It includes various modifications, alternative forms, and other variants within the scope of the present invention and conceivable to a person skilled in the art, in particular any combination of the different modes of operation described above, which may be applied separately or in combination.

The invention claimed is:

1. A vehicle seat comprising:
   a seating part,
   a backrest mounted so as to pivot on the seating part,
   a hinge mechanism adapted for adjusting the angular position of the backrest relative to the seating part, the hinge mechanism comprising:
      a first frame intended to be fixed to the seating part and a second frame intended to be fixed to the backrest,
      a blocking device for maintaining the angular position of the second frame relative to the first frame, the blocking device being movable between a blocking position where the angular position of the second frame relative to the first frame is maintained and a release position where the second frame is movable relative to the first frame,
   a guide mechanism comprising:
      a track unit comprising a first rail and a second rail both extending in a longitudinal direction and mounted so as to slide relative to one another along the longitudinal direction, and
      a locking device mounted so as to be movable between a locking position where the position of the second rail relative to the first rail is locked, and an unlocking position where said locking device allows the second rail to move relative to the first rail,
   a single actuation device, adapted to operate selectively in either:
      a backrest control mode, acting on the blocking device to cause movement of the blocking device to the release position,
      or a track control mode, acting on the locking device to cause movement of the locking device to the unlocking position,
   the actuation device being controlled by control means operable by a user to cause the actuation device to operate either in backrest control mode or track control mode,
   wherein said seat further comprises a transmission member actuated by the actuation device, the transmission member being arranged between the actuation device and the blocking device and locking device, the transmission member being adapted for moving the locking device to the unlocking position and the blocking device to the release position.

2. The seat according to claim 1, wherein the actuation device is controlled so as to operate the actuation device in either backrest control mode or track control mode, independently of the angular position of the second frame relative to the first frame.

3. The seat according to claim 1, wherein the blocking device is resiliently biased towards the blocking position and the locking device is resiliently biased towards the locking position.

4. A vehicle seat comprising:
a seating part,
a backrest mounted so as to pivot on the seating part,
a hinge mechanism adapted for adjusting the angular position of the backrest relative to the seating part, the hinge mechanism comprising:
  a first frame intended to be fixed to the seating part and a second frame intended to be fixed to the backrest,
  a blocking device for maintaining the angular position of the second frame relative to the first frame, the blocking device being movable between a blocking position where the angular position of the second frame relative to the first frame is maintained and a release position where the second frame is movable relative to the first frame,
a guide mechanism comprising:
  a track unit comprising a first rail and a second rail both extending in a longitudinal direction and mounted so as to slide relative to one another along the longitudinal direction, and
  a locking device mounted so as to be movable between a locking position where the position of the second rail relative to the first rail is locked, and an unlocking position where said locking device allows the second rail to move relative to the first rail,
a single actuation device, adapted to operate selectively in either:
  a backrest control mode, acting on the blocking device to cause movement of the blocking device to the release position,
  or a track control mode, acting on the locking device to cause movement of the locking device to the unlocking position,
the actuation device being controlled by control means operable by a user to cause the actuation device to operate either in backrest control mode or track control mode,
wherein said seat further comprises a transmission member actuated by the actuation device, the transmission member being arranged between the actuation device and the blocking device and locking device, the transmission member being adapted for moving the locking device to the unlocking position and the blocking device to the release position, said seat further comprising a first control member operable by a user to operate the actuation device in backrest control mode and a second control member operable by a user to operate the actuation device in track control mode.

5. The seat according to claim 4, wherein the first control member and the second control member are directly connected to the actuation device.

6. The seat according to claim 1, wherein the transmission member is mounted so as to rotate about an axis of rotation in a first direction of rotation so as to move the locking device to the unlocking position and in a second direction of rotation, opposite the first direction of rotation, so as to move the blocking device to the release position.

7. The seat according to claim 1, wherein the locking device comprises an unlocking member and a unlocking pin, the unlocking member is mounted so as to be movable between an inactive position where it is at a distance from the unlocking pin and an active position where it exerts force on the unlocking pin.

8. The seat according to claim 7, wherein the transmission member comes into contact with the unlocking member so as to move the latter from the inactive position to the active position.

9. The seat according to claim 1, wherein the blocking device comprises a driving member assembled to the transmission member in order to control the release of the second frame relative to the first frame.

10. The seat according to claim 9, wherein the driving member is a cable.

11. The seat according to claim 10, wherein the cable comprises a first end and a second end, the first end being assembled to the transmission member, the second end cooperating directly with the blocking device.

12. The seat according to claim 11, wherein the first end comprises a pin for retaining the cable on the transmission member so that rotation of the transmission member in the second direction causes the cable to wind around the transmission member.

13. The seat according to claim 10, wherein the transmission member comprises a groove in which the cable is intended to be housed when it is wound.

14. The seat according to claim 1, wherein the actuation device is fixed to the track unit.

15. The seat according to claim 1, wherein the actuation device is a reversible electric actuator cooperating with a reversible gear motor.

16. The seat according to claim 1, further comprising a return spring associated with the actuation device.

17. The seat according to claim 1, further comprising a second track unit and a second locking device, the second locking device being connected to the locking device of the first track unit by a crosspiece.

18. A method for adjusting the position of a seat according to claim 1, comprising the steps of:
controlling the actuation device in a track control mode and moving the second rail relative to the first rail so as to adjust the position of the seating part of the seat in the longitudinal direction,
controlling the actuation device in a backrest control mode and moving the backrest relative to the seating part so as to adjust the angular position of the backrest relative to the seating part,
the steps being independent of one another, it being possible for one to take place before, after, or in the absence of the other.

* * * * *